UNITED STATES PATENT OFFICE.

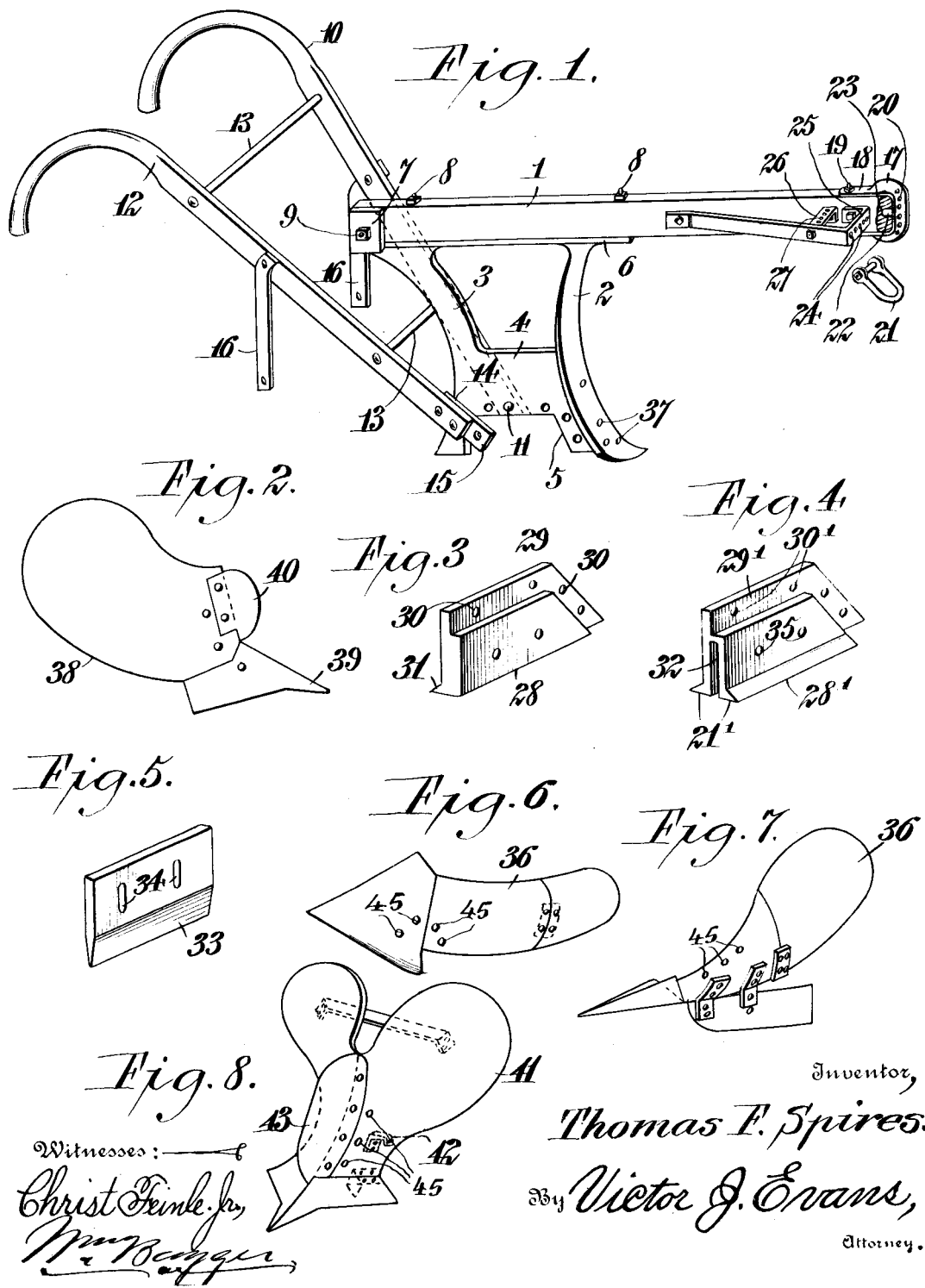

THOMAS F. SPIRES, OF CENTRAL ACADEMY, MISSISSIPPI.

CULTIVATING-MACHINE.

1,051,772. Specification of Letters Patent. Patented Jan. 28, 1913.

Application filed December 18, 1909. Serial No. 533,826.

*To all whom it may concern:*

Be it known that I, THOMAS F. SPIRES, a citizen of the United States, residing at Central Academy, in the county of Panola and State of Mississippi, have invented a new and useful Cultivating-Machine, of which the following is a specification.

The invention has for its object to provide a beam carrying a frame of simple and improved construction adapted to receive a landside which may be adapted to carry a vertically adjustable cutting member; said frame being also adapted to support any one of a plurality of earth engaging tools which may be used in connection therewith.

The invention further consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a perspective view of a beam which is equipped with a frame and with handles in accordance with the invention. Fig. 2 is a perspective view of a turning plow adapted to be used in connection with the invention. Fig. 3 is a perspective view of a landside bar adapted to be used in connection with the invention. Fig. 4 is a perspective view, showing a landside bar of a slightly modified construction. Fig. 5 is a perspective view showing a cutting member adapted to be used in connection with the landside bar shown in Fig. 4. Figs. 6, 7 and 8 are perspective views showing various forms of earth engaging implements adapted to be used in connection with the invention.

Corresponding parts in the several figures are denoted by like characters of reference.

The plow beam 1 carries a frame comprising front and rear standards 2 and 3 and a web 4 connecting said front and rear standards and having a recess 5 in the lower edge thereof. The standards 2 and 3 are connected at their upper ends by a horizontal flange member 6 upon which the beam is supported, said flange being provided at its rear end with a lug 7 engaging the side of the beam, which latter is secured in position upon the frame by means of bolts 8 passing vertically through the flange member 6 and a bolt 9 passing transversely through the lug 7, the beam 1 and through a handle 10, the lower end of which is secured upon one side of the web 4 by means of a bolt 11. A second handle 12 is connected with and spaced from the handle 10 by means of rounds 13, and said handle 12 has at its lower end a metallic strap 14 having a terminal lip 15 which is apertured for the passage of a connecting member, such as a bolt, whereby it may be connected with any one of a variety of earth engaging implements which may be supported upon the frame. The handles 10, 12 have been shown as being equipped with depending bars 16 which may be utilized as braces. Mounted upon the front end of the beam is a clevis member 17 and a laterally extending bracket member 25 with which the clevis member may be interchangeably connected to provide for adjustment of the draft laterally. The clevis member 17 is provided with a vertical series of perforations 20 with any one of which a draft link 21 may be connected for adjustment of the draft vertically.

A landside bar, shown at 28 in Fig. 3 of the drawings, is adapted to fit snugly in the recess 5 at the lower edge of the web 4 of the plow frame, said landside bar being provided with a flange 29 having apertures 30 for the passage of fastening members, such as bolts, whereby it may be secured firmly upon the web. The lower edge of the landside bar is laterally expanded, as shown at 31, to form a broad bearing face. In place of the landside bar shown in Fig. 3 that which is illustrated in Fig. 4 at 28' may be used, said landside bar being provided with a flange 29' having apertures 30' for the passage of fastening bolts. The landside bar 28' is provided with a longitudinal notch or recess 32 in its underside for the reception of a cutting member 33 illustrated in Fig. 5, by reference to which it will be seen that said cutting member is provided with vertical slots 34 for the passage of fastening members, such as bolts, which may extend transversely through said cutting member and through apertures 35 in the landside bar. The latter, as shown in Fig. 4, is expanded laterally in opposite directions at its lower edge, as shown at 21', to form a broad bearing surface.

In Figs. 6 and 7 there has been shown a scraper wing 36, the same being seen from different points of view, said scraper wing being adapted to be bolted upon the frame, the front standard of which is provided with apertures 37 to receive connecting bolts for this purpose. In Fig. 2 has been shown a breaking plow 38 having a point 39 and a cutting member or colter 40. In Fig. 8 has been shown a middle buster 41 likewise adapted to be mounted upon the frame and having on its underside a bracket member 42 shown in dotted lines and adapted to be connected with the lip 15 of the strap 14 connected with the handle 12. The middle buster also is equipped with a cutting member or colter 43.

The foregoing description comprehends only a limited number of the earth engaging implements which may be mounted upon and used in connection with the frame of my improved implement. It will, of course, be understood that the earth engaging implements which are to be used in connection with the device are to be provided with perforations adapted to register with one or more perforations 37 in the front standard of the frame for the passage of one or more fastening bolts. It will also be understood that additional apertures may be formed in the earth engaging implements in order to permit the position to be shifted at will, as seen, for instance, in Fig. 6 at 45. It will be seen that the landsides 28, 28' may be used interchangeably, according to the special purpose for which the invention is to be employed, and according to whether or not it is desired to use the cutting member 33. The general construction of the implement is simple and inexpensive, and it is capable of being effectively used for a variety of purposes.

Having thus described the invention, what is claimed as new, is:—

1. In a cultivating implement, a beam supporting frame including a vertical web having a recess at its lower edge, a landside member snugly fitting said recess and having a flange engaging the web, and a vertically adjustable cutting member detachably connected with the landside member.

2. In a cultivating implement, a beam supporting frame including a vertical web having a recess at its lower edge, a landside bar snugly fitting said recess and having a laterally expanded lower edge, and a cutting member connected with said landside member for vertical adjustment.

3. In a cultivating implement, a beam supporting frame including a vertical web having a recess at its lower edge, a landside member snugly fitting said recess and having a vertical notch and a flange engaging one side of the web, the lower edge of said landside bar being laterally expanded, and a cutting member adjustably engaging the notch in the landside bar.

THOMAS F. SPIRES.

Attest signature:
J. B. CAROTHERS,
V. H. WARD.